Aug. 18, 1953     C. R. NIKLASON     2,649,057
CONFECTION MOLDING
Filed July 31, 1947     2 Sheets-Sheet 1
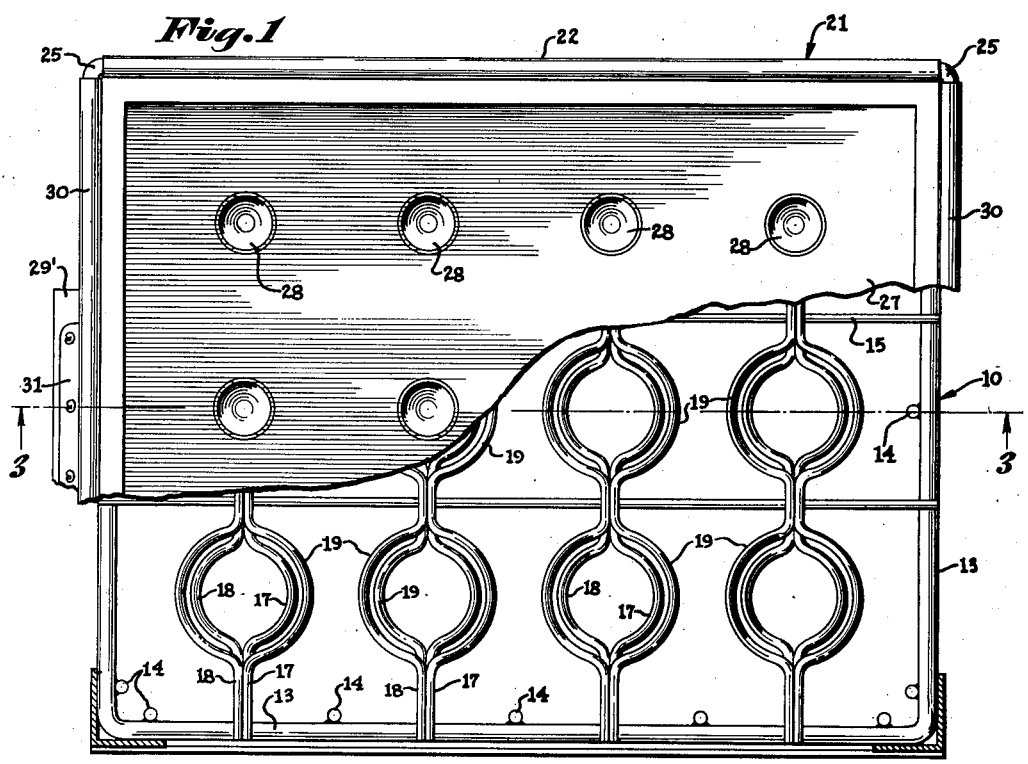
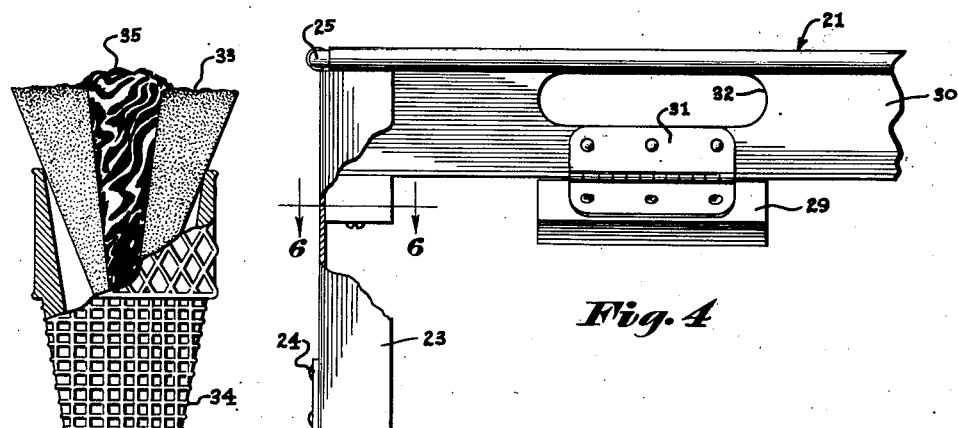
Inventor
CLARENCE R. NIKLASON Aug. 18, 1953     C. R. NIKLASON     2,649,057
CONFECTION MOLDING Filed July 31, 1947     2 Sheets-Sheet 2

Inventor
CLARENCE R. NIKLASON

Patented Aug. 18, 1953

2,649,057

UNITED STATES PATENT OFFICE 2,649,057

CONFECTION MOLDING

Clarence R. Niklason, Arlington County, Va.

Application July 31, 1947, Serial No. 765,015

3 Claims. (Cl. 107—54)

The present invention relates in general to methods for making edible articles, and more particularly to methods for shaping frozen confections, such as ice cream, sherbets, and the like, to impart thereto a conical shape with a hollow conical recess therein for dispensing purposes.

In the retail dispensing of frozen confections, such as ice cream and the like, it has been found advantageous to dispense individual portions of the confection in individual containers, removing the container at the time the confection is served to the purchaser. Such a method results in a saving of confection to the retail dealer over the long established dispensing by the scoopful from a bulk container, while permitting more sanitary handling of the confection and more accurate delivery of portions of correct size. It is further desirable in the dispensing of many types of confections to provide individual portions of confection with a recess or cavity therein for the purpose of adding an edible substance such as a syrup, crushed fruits, jam jelly, or the like, of different flavors, to permit the ready production of sundae type confection from the portion provided.

In the methods and apparatus heretofore provided for the production of such portions of confection in large quantities, considerable difficulty has been experienced in effecting ready removal of the confection from the mold, due to the frost bond formed between the outer surface of the confection portion and the wall of the mold, and particularly that formed with portions of the molds adapted to form the recess or cavity in the portion of confection.

Accordingly, an object of the present invention is the provision of a novel method of packaging frozen confections in individual containers.

Another object of the present invention is the provision of a novel method of packaging and dispensing a frozen confection in forms appropriate for use as a sundae.

Another object of the present invention is the provision of a device for molding in a single operation a large quantity of confection, such as ice cream, into a plurality of conically shaped portions of appropriate size and shape to fit the edible hollow cones in common use.

Another object of the present invention is the provision of a novel device for molding a large quantity of frozen confection into a plurality of conically shaped portions with a conical core provided therein that can subsequently be filled with flavoring syrup and the like to form a sundae type of confection.

Another object of the present invention is the provision of a novel device for molding a large quantity of frozen confection into a plurality of conically shaped portions with a conical core provided therein, the device having means for effecting the ready destruction of any frost bond occurring between the mold and the confection to effect removal of the portions from the mold.

Other objects, advantages and capabilities of the invention will become apparent from the following description, taken in conjunction with the accompanying drawings showing only a preferred embodiment of the invention, in which:

Fig. 1 is a plan view of a confection mold embodying the present invention with a portion of the upper surface thereof broken away to reveal the inner structure of the mold;

Fig. 4 is a partial end elevation of the removable upper portion of the mold, showing the hinged spacing members for effecting removal of the confection from the mold and spacing knees for adjusting the normal spacing of the portions of the mold in accordance with the size of confection portions desired to be molded;

Fig. 5 is a view partially in section and partially in elevation of the confection portion as commercially dispensed in edible cone shaped receptacles; and, Fig. 6 is a horizontal sectional view of the spacer knee members taken along the lines 6—6 of Figure 4.

Figure 2:
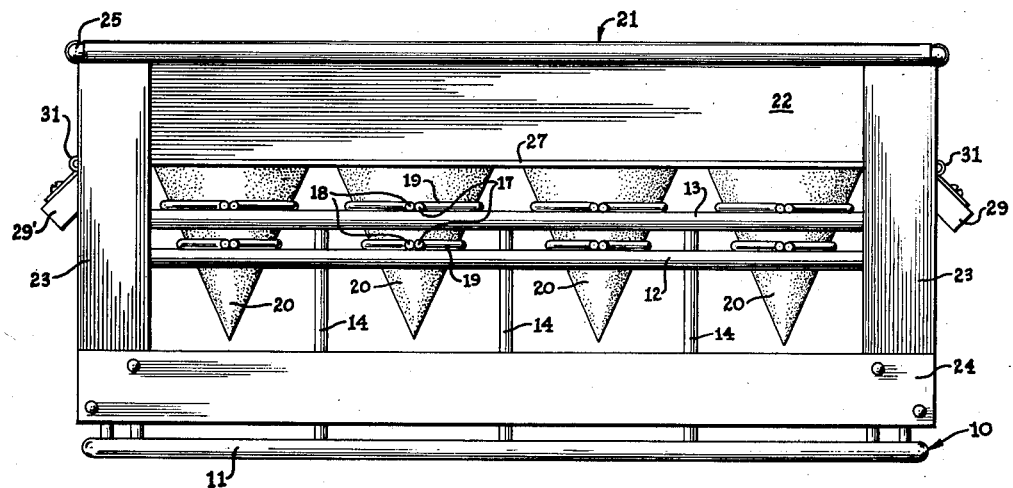
Fig. 2 is a side elevation of the confection mold with the mold parts arranged for the freezing operation.
Figure 3:
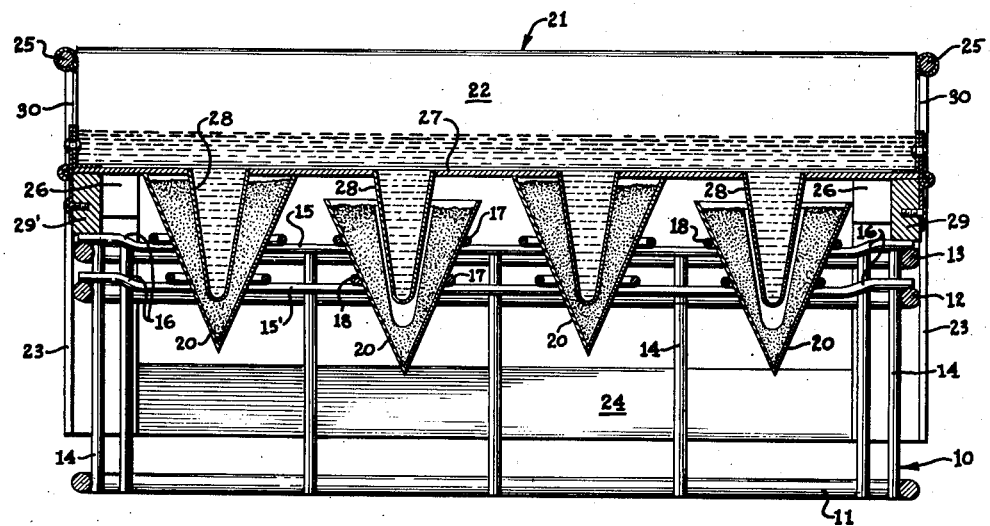
Fig. 3 is a vertical longitudinal sectional view of the confection mold, taken along the lines 3—3 of Figure 1, showing the molded confection in place in the mold, and the upper section of the mold raised to separate the confection from the core.

Referring to the drawings, in which like reference characters designate corresponding parts throughout the several figures, in the illustrated embodiment of the invention, and particularly to Figures 1, 2 and 3, there is shown a tray or rack, generally designated at 10, forming a base frame for the mold and designated to hold a plurality of confection containers. The rack may be made of any desirable material and in a substantial variety of desirable shapes adaptable for use with air blast freezing equipment or other freezing means with which the mold is to be employed. The rack is shown as constructed of wire, for convenience, simplicity and economy of construction, handling, and for immersing the articles supported therein in fluids, each of the wire members forming the rack 10 being preferably soldered, brazed, welded or secured in any other desirable manner to the other wire members at every point of contact between wire members in the rack 10.

The rack 10 comprises a base frame 11 shaped in substantially rectangular form and horizontally disposed, an intermediate frame 12, and an upper frame 13, both likewise horizontally disposed and of the same size and shape as the base frame 11. The frames 11, 12 and 13 are disposed in horizontally spaced relationship to each other and held fixedly in their respective positions by vertically disposed side posts or rods 14, secured at each point of contact with the frames 11, 12 and 13 to the frames.

The upper and intermediate frames 13 and 12 are provided with supporting rods 15, 15' disposed axially longitudinally of the frames 13 and 12 and spaced transversely between the sides thereof, the supporting rods 15, 15' having their ends, as indicated at 16, deflected upwardly to overlie and rest upon the frames 13 and 12. Disposed transversely across the supporting rods 15, 15' are a plurality of pairs of wires 17, 18 with their ends also overlying and resting upon the frames 13 and 12 and secured thereto. These pairs of wires 17, 18 are disposed side by side and provided at appropriate intervals transversely of the sides of the frames 13 and 12 with container supporting loops 19 formed by arcing the adjacent wires 17 and 18 complementarily outward, the wires being secured together by suitable means along their adjacent contacting surfaces. The container supporting loops 19 formed by wires 17 and 18 secured to the intermediate frame 12 are made of smaller diameter than the corresponding loops 19 formed in the wires 17 and 18 secured to the upper frame 13, such that the corresponding loops are adapted to receive and support on a selected horizontal level containers or cups 20, formed in substantially conical shape and of a liquid impervious material, such as paraffin paper. The rack 10 then in effect forms a mold rack with the containers 20 forming the molds adapted to receive the confection in liquid state and shape the same in substantially conical form.

A means is provided for forming conical cores within the confections contained in the conical container molds 20. A tray member 21, formed preferably of sheet metal, is adapted to overlie the rack member 10 and rest thereon. The sides 22 of the tray member 21 are provided with vertical corner posts 23 extending downwardly therefrom with horizontally disposed bars 24 of sheet metal secured between the lower ends of the corner posts 23 to add strength and rigidity to the structure, these corner posts 23 and bars 24 being adapted to extend around the sides of the rack member 10 and engage the sides of the upper and intermediate frames 13 and 12 to position the tray member 21 laterally relative to the rack member 10. The upper edge of the tray member 21 is likewise provided with a wire frame 25 similar to the wire frames 11, 12 and 13 of the rack member 10, secured to the upper edges of the side members 22 of the tray member 21 to add strength to the structure.

Figure 6:
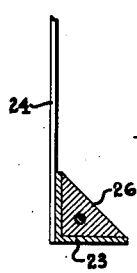

In the embodiment shown, spacer blocks or knees 26, shown particularly in Figures 4 and 6, are mounted in the corners of the tray member 21 against the under side of the bottom 27 of the tray member 21 adapted to rest upon the corners of the upper wire frame 13 of the rack member 10, and are designed of a size vertically to maintain the bottom 27 of the tray member 21 flush and in engagement with the top or lip of each of the container molds 20 positioned in the supporting loops 19 formed in the rack member 10. Obviously, the size of spacer blocks 26 is varied as a function of the size of conical container molds 20, to maintain the top of the containers 20 substantially in contact with the bottom 27 of the tray member 21.

Extending downwardly from the bottom 27 of the tray member 21 are a plurality of hollow conical projections 28 positioned to enter the conical molds formed by the containers 20 when the tray member 21 is seated on the rack member 10. The cross-sectional area of each of the conical projections 28 is considerably smaller than the cross-sectional area of the associated conical mold formed by the containers 20, to provide an annular conical space between the two mold members.

Pivoted spacer blocks 29, 29' of greater height than the spacer blocks 26, are pivoted to the ends 30 of the tray member 21 on substantially the transverse center thereof by hinge members 31, the hinged spacer blocks 29, 29' being operative to be pivoted downwardly into a vertical position where the upper shoulder of the block 29 bears upon the under side of the bottom 27 of the tray member 21 and the lower surface of the block 29 is in position to rest upon the upper wire frame 13 of the rack member 10, this being operative to support the tray member 21 on the rack member 10 with the bottom 27 thereof and the conical projections 28 disposed at a greater spacing from the rack member 10. To facilitate the lifting of the tray member 21 necessary to effecting swinging down of the hinged spacer blocks 29 into vertical position, openings 32 of a size to permit entry of the hand therethrough are provided in the ends 30 of the tray member 21.

Operation of the device is as follows. The tray member 21 is removed from the rack member 10, and the containers 20 forming the molds for the confection are placed in the supporting loops 19 formed in the rack member 10. A predetermined quantity of the confection, for example ice cream mix, in liquid form, is placed in the containers 20, the quantity of confection placed therein being just sufficient to fill the containers 20 when the conical projections 28 on the tray member 21 are lowered into the containers 20. The tray member 21 is then placed on the rack member 10 with the spacer blocks 26 resting on the corners of the upper wire frame 13 of the rack member 10, and the corner posts 23 and bars 24 surrounding the rack member 10 the bottom 27 of the member 21 being disposed flush with the tops of the containers 20. During this operation, the conical projections 28 are brought into their inwardly disposed position within the containers 20 forcing the confection therein aside, the displaced confection being distributed thereby through the containers 20 to substantially fill the same. The device with the liquid confection in the containers 20 is then placed in a suitable air blast or other freezing means to harden the confection. The open sides and bottom of the tray member 21 and the lattice structure of the rack member 10 permit free circulation of the chilling fluid solution around the mold forming containers 20 when the device is immersed therein.

After the confection in the containers 20 becomes hardened, the device is removed from the freezing means, and the tray member 21 lifted slightly by the openings 32 in the ends thereof rendering the tray member 21 no longer spaced from the rack member 10 by a distance defined by the thickness of the spacer blocks 26. The hinged spacer blocks 29, 29' are then pivoted into vertical position on the hinges 31, and the tray member 21 lowered until the hinged spacer blocks 29, 29' rest on the upper wire frame 13 of the rack member 10. The frost bond formed between the confection in the containers 20 and the walls of the hollow conical projections 28 depending from the bottom 27 of the tray member 21 will carry the containers 20 upward with the tray member 21 and dispose the containers 20 above the seats therefor formed by the supporting loops 19 and out of engagement with the wires 17 and 18 forming the loops 19. Warm water may then be circulated through the tray 21 and the hollow portions of the conical projections 28 depending therefrom to break the frost bond by thawing slightly the confection contacting the walls of the tray and projections 28, the containers 20 and the confection therein dropping back into seated relation in the supporting loops 19 in the rack member 10 when the confection is thawed sufficiently to break the frost bond. This arrangement prevents undo thawing of the confections, as immediately the frost bond is broken, the containers drop into the rack, removing the confection from the warmed tray and conical projections 28.

The containers with the frozen confection therein may then be packed for convenient storage or shipment to points for commercial dispensing of the confection, the confection being left in the containers 20 for convenience and sanitation in handling. If, for example, it is desired to dispense the confection in the form of an ice cream cone, the ice cream shaped in the truncated conical form, as shown in section in Figure 5, and indicated at 33, is separated from its container 20 by stripping the container therefrom, the conical ice cream portion placed in an edible cone-shaped container 34, and the inner conical recess 35 filled with any desired syrup, fruits, or other confection.

From the foregoing description, it will be apparent that a novel method of packaging and dispensing frozen confections, together with apparatus for effecting the method, has been provided which can be performed rapidly and economically, the apparatus for effecting the method being extremely simple in construction, easy to manipulate, durable, and economical to manufacture and use.

It will be also apparent that the invention lends itself to the formation and dispensing of completely packaged sundaes, this being effected by filling the inner conical recesses formed in the confection, after the conical projections 28 are removed therefrom, with the flavoring medium desired to be used therewith, and subjecting the confection and flavoring medium to a subsequent freezing operation to congeal the flavoring medium.

While I have particularly shown and described one particular embodiment of the invention, it is distinctly understood that the invention is not limited thereto but that various modifications may be made in the invention without departing from the spirit and scope thereof, and it is desired, therefore, that only such limitations shall be placed thereon as are imposed by the prior art and are set forth in the appended claims.

What is claimed is:

1. A process for making a frozen confection comprising the steps of, inserting a plurality of molding elements into masses of fluid confectionary material to define indentations in the material, removing heat from the confectionary material by way of the indentation molding elements to freeze the confectionary material and produce a frost bond therebetween, raising the indentation molding elements to suspend the masses of confectionary material therefrom, and supplying heat to the confectionary material by way of the indentation molding elements to break the frost bond suspending said masses.

2. A process for making a frozen confection comprising the steps of, inserting a plurality of vertical molding elements into masses of fluid confectionary material to define axial indentations extending inwardly of the material, removing heat from the confectionary material by way of the indentation molding elements to freeze the confectionary material and produce a frost bond between the masses of confectionary material and the molding elements, raising the indentation molding elements to suspend the masses of confectionary material therefrom, and supplying heat to the confectionary material by way of the indentation molding elements to break the frost bond suspending said masses.

3. A process for making a frozen confection comprising the steps of, inserting a plurality of vertical molding elements into masses of fluid confectionary material to define a recess in each of said masses extending inwardly thereof, removing heat from the confectionary material through the molding elements to freeze the confectionary material and produce a frost bond between the masses of material and the molding elements, raising the recess molding elements to suspend the masses of confectionary material therefrom, and supplying heat to the confectionary material through the recess molding elements to break the frost bond suspending said masses and free the masses of their suspended state.

CLARENCE R. NIKLASON.

References Cited in the file of this patent

UNITED STATES PATENTS

| Number | Name | Date |
|---|---|---|
| 802,696 | Jackson et al. | Oct. 24, 1905 |
| 1,697,051 | Crumlick | Jan. 1, 1929 |
| 1,893,513 | Balian | Jan. 10, 1933 |
| 2,007,572 | Jancsy | July 9, 1935 |
| 2,087,729 | Cowling | July 20, 1937 |
| 2,109,822 | Eddy | Mar. 1, 1938 |
| 2,320,985 | Overland | June 1, 1943 |
| 2,334,654 | Sportolari | Nov. 16, 1943 |